United States Patent [19]

Okada et al.

[11] Patent Number: 5,124,140
[45] Date of Patent: Jun. 23, 1992

[54] PROCESS FOR STEAM REFORMING OF HYDROCARBONS

[75] Inventors: Osamu Okada; Takeshi Tabata; Masataka Masuda, all of Osaka, Japan

[73] Assignee: Osaka Gas Company Limited, Osaka, Japan

[21] Appl. No.: 523,022

[22] Filed: May 14, 1990

[30] Foreign Application Priority Data

May 15, 1989 [JP] Japan .................................. 1-122077

[51] Int. Cl.⁵ ........................... C01B 3/24; C01B 3/26
[52] U.S. Cl. .................................. 423/650; 423/652; 423/653
[58] Field of Search ............... 423/650, 652, 653

[56] References Cited

U.S. PATENT DOCUMENTS

| | | |
|---|---|---|
| 3,387,942 | 6/1968 | Habermehl et al. . |
| 3,551,124 | 12/1970 | Iwaki et al. . |
| 3,554,930 | 1/1971 | Rogers et al. . |
| 3,595,805 | 7/1971 | Cohn et al. . |
| 3,660,276 | 5/1972 | Lacey . |
| 3,771,261 | 11/1973 | Mandelik et al. . |
| 4,093,029 | 6/1978 | Weisz et al. . |
| 4,098,339 | 7/1978 | Weisz et al. . |
| 4,113,606 | 9/1978 | Mulaskey . |
| 4,383,982 | 5/1983 | Pinto .................................. 423/359 |
| 4,521,387 | 6/1985 | Broecker et al. . |
| 4,631,182 | 12/1986 | Tottrup et al. . |
| 4,695,366 | 9/1987 | Miller et al. . |
| 4,888,157 | 12/1989 | Carnell et al. ................... 423/230 |
| 4,983,367 | 1/1991 | Denny et al. ................... 423/230 |
| 4,985,074 | 1/1991 | Okada et al. . |

FOREIGN PATENT DOCUMENTS

| | | |
|---|---|---|
| 0109635 | 5/1984 | European Pat. Off. . |
| 0243052 | 10/1987 | European Pat. Off. . |
| 0320979 | 6/1989 | European Pat. Off. . |
| 0324071 | 7/1989 | European Pat. Off. . |
| 411389 | 3/1925 | Fed. Rep. of Germany . |
| 3503455 | 8/1985 | Fed. Rep. of Germany . |
| 61-97105 | 5/1986 | Japan . |
| 61-122102 | 6/1986 | Japan . |
| 62-17003 | 1/1987 | Japan . |
| 64-279867 | 5/1989 | Japan . |
| 64-279868 | 5/1989 | Japan . |
| 1522389 | 8/1978 | United Kingdom . |
| 2015027 | 9/1979 | United Kingdom . |

Primary Examiner—Wayne Langel
Attorney, Agent, or Firm—Finnegan, Henderson, Farabow, Garrett, Dunner

[57] ABSTRACT

A novel process for desulfurizing and steam reforming sulfur-containing hydrocarbons is disclosed. The process comprises the steps of (a) desulfurizing the sulfur-containing hydrocarbon to a sulfur content of 5 ppb or less by use of a desulfurization agent, (b) reforming the desulfurized hydrocarbon at low temperature in an adiabatic reactor by use of steam, and (c) reforming the resultant gas reformed in the course of step (b) at high temperature in an external-heating reformer furnance.

20 Claims, 3 Drawing Sheets

PROCESS FOR STEAM REFORMING OF HYDROCARBONS

BACKGROUND OF THE INVENTION

1. Field of the Invention

This invention relates to a process for steam reforming of hydrocarbons: particularly, to a process for steam reforming of highly desulfurized hydrocarbons.

2. Prior Arts

Steam reforming of hydrocarbons is a useful process for manufacturing industrial raw materials. A high-temperature reaction produces mainly hydrogen and carbon monoxide, and low-temperature reaction, mainly methane and carbon dioxide. Since the sulfur component in the hydrocarbons as raw materials poisons the steam reforming catalyst, the hydrocarbon is desulfurized before steam reforming.

So far, in a typical desulfurization process conducted prior to steam reforming of hydrocarbons, the organic sulfurs in the hydrocarbon are hydrogenated in the presence of a Ni-Mo or Co-Mo catalyst, and the produced $H_2S$ is removed by adsorption to ZnO.

However, such a conventional method involves many problems. For example, if the hydrocarbon contains organic sulfurs, especially hardly decomposable organic sulfurs as thiophene in an amount higher than a certain level, in the hydrodesulurization step, undecomposed organic sulfur will slip and pass through without being adsorbed by the ZnO. Also, in adsorption desulfurization, for example, because of the equilibrium shown by the quantity of $H_2S$ and COS is not decreased to less than a certain quantity. Particularly, in the presence of $H_2O$ and $CO_2$, this trend is remarkable. Further, if the desulfurization system is unstable in startup and shutdown of the plant, sulfur can be scattered from the hydrodesulfurization unit and adsorption desulfurization catalyst and increase the sulfur concentration in the refined product. Therefore, the desulfurization step in the steam reforming process at present must be controlled so that the sulfur concentration in the hydrocarbon after purification is in the level of several ppm to 0.1 ppm.

The thus desulfurized hydrocarbon is then subjected to steam reforming in the presence of a catalyst such as Ru catalyst and Ni catalyst. Nevertheless, as shown by the research of McCarty et al. (McCarty et al.: J. Chem. Phys. vol. 72, No. 12, 6332, 1980; J. Chem. Phys. vol. 74, No. 10, 5877, 1981), the sulfur adsorptivity of Ni and Ru is so powerful that the most part of the catalyst surface is covered by sulfur even if the sulfur content of the hydrocarbon is trace. Specifically, in the condition of about 0.1 ppm in the sulfur content, the best level at the present, about 90% of the surface of the Ni or Ru catalyst will be covered by sulfur in a short time under the inlet condition (about 450° C.) of a conventional steam reforming process. This means that the present level of desulfurization of hydrocarbon cannot prevent the sulfur poisoning of the catalyst in the steam reforming.

To solve such problems, a steam reforming process which uses a hydrocarbon which has been desulfurized to less than 0.05 ppm is proposed in Japanese Patent Unexamined Publication No. 17003/1987. However, the process disclosed there cannot satisfactorily prevent the poisoning of the steam reforming catalyst because of insufficient desulfurization of the hydrocarbon, and cannot decrease the amount of steam used as described later.

On the other hand, when hydrocarbon such as naphtha is subjected to steam reforming in a reformer furnace, decomposition of higher hydrocarbons which is an endothermic reaction occurs at the inlet part of the reaction tube in the furnace. Since the reaction rate at the inlet part is determined by heat flux using a generally used reactor tube at the present, space velocity (SV) is limited even if a steam reforming catalyst of superior activity is applied. If the temperature of the inlet part was raised, higher hydrocarbon would be decomposed into carbon at the part.

It has been proposed that an adiabatic low-temperature steam reforming reactor (called "prereformer", hereinafter) be equipped in the upstream of an usual high-temperature steam reforming furnace (external heating reactor). In this system, decomposition of higher hydrocarbon is completed in the prereformer, and the size of the reformer furnace is reduced by raising the inlet temperature. However, the catalyst in the prereformer is easily poisoned by sulfur because relatively low temperature region is long in the prereformer, and so the catalyst bed is designed to be of enough volume. As a result, little improvement can be achieved by this system compared with a conventional single reformer furnace system.

SUMMARY OF THE INVENTION

As a result of earnest research, the inventors have found that when the hydrocarbon used in the steam reforming is highly desulfurized to a very low level of sulfur content, the poisoning of the steam reforming catalyst by sulfur and the deposition of carbon on the catalyst can be substantially prevented. And the present invention is intended to propose a economical steam reforming process with compact apparatus.

Accordingly, it is an object of the present invention to provide a process for steam reforming of hydrocarbons which comprises desulfurizing a hydrocarbon to a sulfur content of 5 ppb (as sulfur, same hereinafter) or less by use of a desulfurization agent before subjecting the hydrocarbon to low-temperature steam reforming in an adiabatic reactor (prereformer) followed by high-temperature steam reforming in a reformer furnace.

Heretofore, it is well known that the poisoning by sulfur is the main factor of deterioration of a steam reforming catalyst. However, it is a quite novel knowledge not anticipated so far that not only the deterioration of the steam reforming catalyst by sulfur but also the deposition of carbon on the catalyst can be prevented by decreasing sulfur content to 5 ppb or less, preferably 1 ppb or less, more preferably 0.1 ppb or less in the hydrocarbon used in the steam reforming. Therefore, the method of the present invention makes possible the steam reforming process of low steam/carbon ratio or low hydrogen/oil ratio operation as well as operation using heavy hydrocarbon material such as kerosene and gas oil fractions, which operations were impossible because of the troubles such as decrease of activity of the catalyst and clogging of the reactor owing to carbon deposition. As a result, the economy of the steam reforming process can be greatly improved.

Furthermore, the size of the reformer furnace is considerably reduced because the heat duty of the reactor tube in the furnace is greatly decreased by equipping a prereformer before the reformer furnace. And since the deterioration of the catalyst by sulfur poisoning in the prereformer can be prevented, the size of the prereformer is reduced and both construction cost and catalyst cost are also decreased.

DETAILED DESCRIPTION OF THE INVENTION

In the present invention, the hydrocarbon to be used as a raw material is subjected to desulfurization step to reduce the sulfur content to 5 ppb or less, preferably 1 ppb or less, more preferably 0.1 ppb or less (hereinafter referred to as high-grade desulfurization) prior to steam reforming reaction. Means for attaining such high-grade desulfurization is not limited as far as it can reduce the sulfur content in the hydrocarbon to 5 ppb or less, preferably 1 ppb or less, more preferably 0.1 ppb or less, and, for example, a method which makes the sulfur adsorbed by a copper desulfurization agent, silver catalyst, ruthenium catalyst, nickel catalyst, or active carbon can be used. Preferably, desulfurization agents disclosed in Japanese Patent application Nos. 279867/1987 and 279868/1987 which comprise a Copper-Zinc desulfurization agent or Copper-Zinc-Aluminum desulfurization agent, respectively, are used. The copper-containing desulfurization agents are prepared by the following methods:

(1) Copper-Zinc Desulfurization Agent

This desulfurization agent is obtained in the following manner: An aqueous solution containing a copper compound (such as copper nitrate and copper acetate) and a zinc compound (such as zinc nitrate and zinc acetate) and an aqueous solution of an alkaline material (such as sodium carbonate) are used to produce precipitate by conventional co-precipitation procedure. The resultant precipitate is dried and calcined (about 300° C.) to give a mixture of copper oxide and zinc oxide (atomic ratio, usually, copper:zinc = 1: about 0.3-10, preferably 1: about 0.5-3, more preferably 1:1-2.3). The mixture is then reduced at a temperature of about 150°-300° C. in the presence of hydrogen gas diluted with an inert gas (such as nitrogen gas) so that the hydrogen content becomes 6 vol. % or less, preferably about 0.5-4 vol. %.

Thus obtained Copper-Zinc desulfurization agent may contain other components such as chromium oxide, etc.

(2) Copper-Zinc-Aluminum Desulfurization Agent

This desulfurization agent is prepared in the following manner: An aqueous solution containing a copper compound (such as copper nitrate, and copper acetate), zinc compound (such as zinc nitrate and zinc acetate), and aluminum compound (such as aluminum nitrate and sodium aluminate) and an aqueous solution of an alkaline material (such as sodium carbonate) are used to produce precipitate by conventional co-precipitation procedure. The resultant precipitate is then dried and calcined (about 300° C.) to give a mixture of copper oxide, zinc oxide, and aluminum oxide (atomic ratio, usually, copper:zinc:aluminum = 1: about 0.3-10: about 0.05-2, preferably 1: about 0.6-3: about 0.3-1) and the mixture is reduced at about 150°-300° C. in the presence of hydrogen diluted with an inert gas (such as nitrogen gas) so that the hydrogen content becomes 6 vol. % or less, preferably about 0.5-4 vol. %.

Thus obtained Copper-Zinc-Aluminum desulfurization agent may contain other components such as chromium oxide, etc.

The copper-containing desulfurization agents prepared by the above methods (1) and (2) have particulate copper with large surface area uniformly dispersed in zinc oxide (and aluminum oxide) and is in highly active state owing to the chemical interaction with the zinc oxide (and aluminum oxide). Therefore, the use of these desulfurizing agents can certainly reduce the sulfur content in the hydrocarbon to 0.1 ppb or less and can surely remove a hardly decomposable sulfur compound such as thiophene. Particularly, the Copper-Zinc-Aluminum desulfurization agent is excellent in heat resistance because of the effect of the addition of the aluminum oxide and can remarkably reduce the deterioration of strength and sulfur adsorptivity at high temperature.

The high-grade desulfurization using the copper desulfurization agent mentioned above can be carried out at a temperature of about 200°-400° C., pressure of about 1-50 kg/cm$^2$-G, and GHSV (gaseous hourly space velocity) of about 1000-5000.

It is preferable when the raw hydrocarbon contains a large quantity of sulfur component to perform the above high-grade desulfurization after decreasing the sulfur content in the hydrocarbon to about 1-0.1 ppm by a primary desulfurization. This method can decrease the quantity of the desulfurization agent required for use in the high-grade desulfurization. The primary desulfurization can be attained by a conventional method, but preferably performed by the adsorption desulfurization method in view of the convenience of operation and desulfurization efficiency. The adsorption desulfurization method is typified by that using a ZnO desulfurization agent. For example, treating the hydrocarbon in the presence of a ZnO desulfurization agent at a temperature of about 350°-400° C., pressure of about 10 kg/cm$^2$-G, and GHSV of about 1000, the sulfur content in the hydrocarbon can be reduced to about 1-0.1 ppm. However, the adsorption desulfurization method is not limited to this and various conditions can be used.

When the raw hydrocarbon contains a hardly decomposable organic sulfur compounds such as thiophene, it is preferable to first hydrodesulfurize the raw hydrocarbon, then apply the above adsorption desulfurization, and apply high-grade desulfurization. This method decreases the content of organic sulfur compounds in the hydrocarbon and decreases the quantity of the desulfurization agent used in the high-grade desulfurization. The hydrodesulfurization can be attained by a conventional method, for example, in the presence of a catalyst of such as Ni-Mo catalyst or Co-Mo catalyst at a temperature of about 350°-400° C., pressure of about 10 kg/cm$^2$-G, and GHSV of about 3000. However, it is not limited to these conditions.

The hydrocarbon desulfurized in high-grade by above method is then mixed with steam and subjected to low-temperature steam reforming in a prereformer. The steam reforming in the prereformer can be attained by a conventional method, for example, by use of catalyst such as ruthenium catalyst or nickel catalyst, at a temperature of about 350°-550° C., pressure of about 0-50 kg/cm²-G, and S/C (number of moles of steam per one mole carbon in the hydrocarbon) of about 0.7-5. The gas passed through the preformer is subsequently subjected to high-temperature steam reforming in a reformer furnace. The steam reforming in the furnace can be attained by a conventional method, for example, by use of catalyst such as ruthenium catalyst or nickel catalyst, at an inlet temperature of about 450°-650° C., outlet temperature of about 650°-900° C., pressure of 0-50 kg/cm²-G. By such steam reforming, the hydrocarbon is converted into hydrogen, carbon monoxide, methane, etc.

The invention is further detailed with reference to flow charts shown in the drawings.

Figure 1:
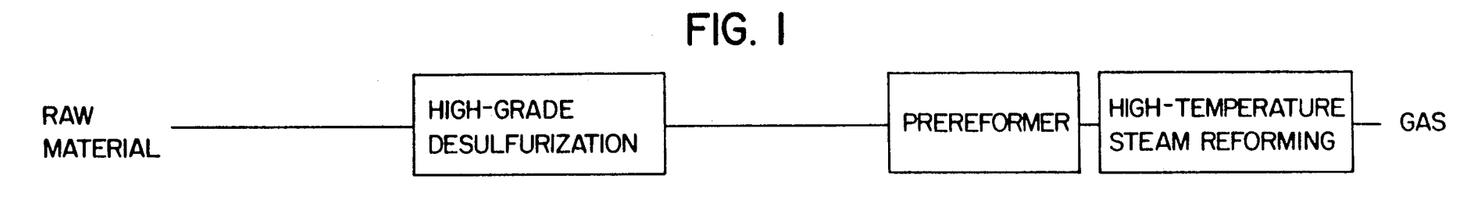
FIGS. 1, 2, and 3 are flow charts showing embodiments of the invention.

FIG. 1 shows an embodiment of the invention using as a raw material a hydrocarbon having a total sulfur compound content of 10 ppm or less. Since the sulfur content of the raw hydrocarbon is relative small in this case, the hydrocarbon is directly subjected to the high-grade desulfurization to decrease the sulfur content to 5 ppb or less, preferably to 1 ppb or less, more preferably to 0.1 ppb or less. As means for the high-grade desulfurization, the above method is used. The desulfurization using a Copper-Zinc desulfurization agent or a Copper-Zinc-Aluminum desulfurization agent as mentioned above is preferably used since it can certainly reduce the sulfur content in the hydrocarbon to 0.1 ppb or less. The hydrocarbon desulfurized in high-grade is then subjected to a conventional steam reforming in a preformer and a reformer furnace to give objective gases.

Figure 2:
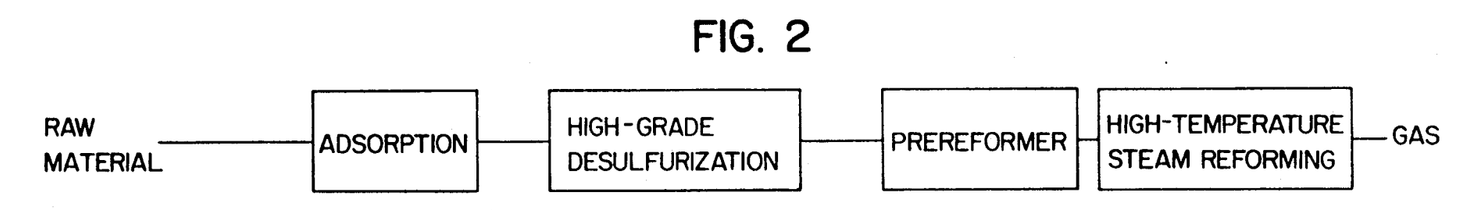

FIG. 2 shows another embodiment of the invention using a raw hydrocarbon having a total sulfur content of 10 ppm or more though the content of hardly decomposable organic sulfur compounds is less than 10 ppm. In this case, since the sulfur content of the raw hydrocarbon is relatively large, the hydrocarbon is first subjected to a primary desulfurization to decrease the sulfur content to about 1-0.1 ppm in order to attain maximum effect of sulfur adsorption in the following high-grade desulfurization step. The primary adsorption desulfurization process can be attained by a conventional process using, for example, a ZnO desulfurization agent. The operation conditions in this case is not particularly limited, but preferably it is in the presence of a ZnO desulfurization agent, at a temperature of about 250°-400° C., pressure of about 10 kg/cm²-G, and GHSV of about 1000. The hydrocarbon which has been subjected to the primary adsorption desulfurization step is sent to the high-grade desulfurization step as shown in FIG. 1, and the sulfur content is reduced to 5 ppb or less, preferably 1 ppb or less, more preferably 0.1 ppb or less. The hydrocarbon desulfurized in high-grade is subjected to a conventional steam reforming in a preformer and a reformer furnace to give objective gases.

Figure 3:
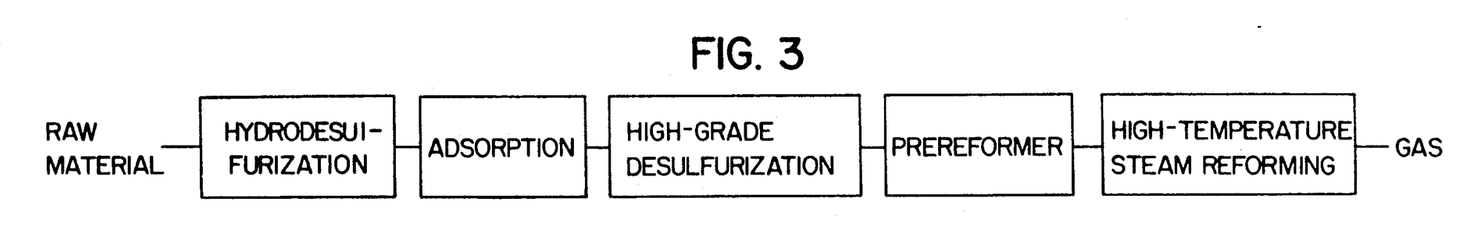

FIG. 3 shows still another embodiment of the invention using as a raw material a hydrocarbon having 10 ppm or more of a total sulfur content comprising mainly hardly decomposable organic sulfur compounds. In this case, the hydrocarbon is subjected to a hydrodesulfurization to decompose the organic sulfur compounds contained therein. The hydrodesulfurization is conducted, for example, in the presence of a catalyst of such as Ni-Mo catalyst or Co-Mo catalyst, at a temperature of about 350°-400° C., pressure of about 10 kg/cm²-G, and GHSV of about 3000. Then the hydrocarbon is subjected to an adsorption desulfurization similar to that described in reference to FIG. 2. In this case, the adsorption desulfurization is preferably carried out at a temperature similar to the outlet temperature of the hydrodesulfurization. Thereafter, it is subjected to the high-grade desulfurization to reduce the sulfur content to 5 ppb or less, preferably 1 ppb or less, more preferably 0.1 ppb or less. Here, since the adsorption desulfurized hydrocarbon has high temperature, it is preferable to use a Copper-Zinc-Aluminum desulfurization agent which is excellent in heat resistance for the high-grade desulfurization. The hydrocarbon desulfurized in high-grade is subjected to a steam reforming by conventional method in a preformer and a reformer furnace to give objective gases.

The hydrocarbon used as the raw material in the invention is typified by natural gas, ethane, propane, butane, LPG (liquefied petroleum gas), light naphtha, heavy naphtha, kerosene, gas oil, coke oven gas, and various town gases.

According to the present invention, since the sulfur content in the raw hydrocarbon is decreased to 5 ppb or less, the sulfur poisoning of the steam reforming catalyst and carbon deposition on the catalyst is prevented very effectively, resulting a large extension of catalyst life. Therefore, the size of the preformer and the reformer furnace is greatly reduced and the costs for construction and fuel used in the reformer furnace can be decreased. Also, the required quantity of steam for the hydrocarbon is reduced. Namely, in a conventional steam reforming, it is necessary for attaining the operation for long period to elevate the S/C to 3.5 or more, however, according to the invention, the stable operation for long period can be attained even when the S/C is 0.7-3.5.

EXAMPLES

The invention will be understood more rapidly by reference to the following Examples and Comparison Examples; however, these Examples and Comparison Examples are intended to illustrate the invention and are not to be construed to limit the scope of the invention.

EXAMPLE 1

To an aqueous solution of copper nitrate, zinc nitrate, and aluminum nitrate was added sodium carbonate as an alkaline substance. The resulting precipitate was, after washing and filtering, molded into tablets of ⅛ inch in height and ⅛ inch in diameter, and the tablets were calcined at about 400° C. Then 150 cc of the calcined tablets (copper:zinc:aluminum=1:1:0.3 in atomic ratio) were packed into a desulfurization reactor (30 cm in the length of desulfurization agent layer), through which nitrogen gas containing 2% hydrogen was passed to effect reduction at 200° C. to give a Copper-Zinc-Aluminum desulfurization agent. Through the thus obtained desulfurization agent, the town gas shown in Table 1 was passed at a temperature 200° C., pressure of 1 kg/cm²-G, and rate of 150 liter/hour to effect desulfurization.

TABLE 1

| | |
|---|---|
| Methane | 86.9 vol % |
| Ethane | 8.1 vol % |
| Propane | 3.7 vol % |
| Butane | 1.3 vol % |
| Dimethyl sulfide | 3 mg-S/Nm³ |

TABLE 1-continued

| t-Butyl mercaptane | 2 mg-S Nm³ |

The sulfur content of the desulfurized town gas was then measured quantitatively by Flame Photometric Detection (FPD)-chromatography. First, a fixed quantity of the desulfurized town gas was passed, at a constant rate, through a U-shaped tube dipped in a dry ice-ethanol cold trap. The lower hydrocarbons, having dew points below the dry ice-ethanol temperature (196 K.) pass through the tube, whereas the sulfur compounds were trapped and enriched in the tube. After a sufficient quantity of the sulfur compounds was collected in the tube, the outlet of the U-shaped tube was connected to the injection port of a gas chromatograph equipped with a flame photometric detector. Thereafter, the cold trap was removed and the tube heated rapidly while a carrier gas was passed through the tube. The sulfur compounds previously trapped in the tube were thus transported by the carrier gas to the FPD-gas chromatograph where the quantity was determined. The detection limit of this method, which varies with the degree of enrichment, is about 0.1 ppb for 100 times enrichment.

The sulfur content of the desulfurized gas was 0.1 ppb or less throughout 1000 hours of operation, and 0.1 ppm or less throughout 2000 hours of operation.

COMPARISON EXAMPLE A

The town gas used in Example 1 was desulfurized in the same manner described above in Example 1, with the exception that the calcined catalyst tablets were not reduced. As a result, the sulfur content of the desulfurized gas, measured by the method described above in Example 1, was 0.08 ppm just 3 hours after the beginning of the desulfurization operation.

COMPARISON EXAMPLE B 54 cc of a commercial Ni-Mo hydrogenating catalyst and 43 cc of zinc oxide were packed in series into a desulfurization reactor (30 cm in the length of the desulfurization agent layer), through which 162 liter/hour of the town gas used in Example 1 and 16.2 liter/hour of hydrogen were passed to effect desulfurization at a temperature of 350° C. and pressure of 1 kg/cm²-G. The sulfur content of the desulfurized gas, measured by the method described above in Example 1, was 0.01 ppm from the beginning of operation.

COMPARISON EXAMPLE C

Naphtha having a sulfur content of 100 ppm was first hydrogenated according to the conventional method in the presence of a Ni-Mo hydrodesulfurization catalyst at a temperature of 380° C., pressure of 10 kg/cm²-G, LHSV (liquid hourly space velocity) of 1.0, and hydrogen/naphtha=0.1 (molar ratio), and subjected to desulfurization in contact with ZnO adsorption desulfurization agent. The sulfur content of the purified naphtha was about 0.2 ppm.

To an aqueous solution of copper nitrate, and of zinc nitrate, respectively, was added sodium carbonate as an alkaline substance. The resulting two kinds of precipitate were, after washing, mixed with each other into slurry mixture. The mixture was molded into tablets and calcined at about 250° C. Then 100 cc of the calcined tablets (⅛ inch in height and ⅛ inch in diameter, copper:zinc=1:0.76 in atomic ratio) were packed into a desulfurization reactor (20 cm in the length of the desulfurization agent), through which nitrogen gas containing 2% hydrogen was passed to effect reduction at 200° C. to give a Copper-Zinc desulfurization agent. Through the thus obtained desulfurization agent, the naphtha obtained through the above primary adsorption desulfurization was passed at a temperature of 350° C., pressure of 8 kg/cm²-G, and rate of 400 liter/hour to effect higher order desulfurization.

The sulfur content of the finally purified gas, was 0.05 ppm after 150 hours of operation, and increased to 0.12 ppm after an additional 24 hours of operation.

EXAMPLE 2

In the same desulfurization method as that of Example 1, the town gas was desulfurized using the desulfurization agent prepared in the same manner as that of Example 1, except the atomic ratio of metals was copper:zinc:aluminum=1:0.2:0.37. The sulfur content of desulfurized gas was measured by the same manner as that of Example 1 (cold trap method) until the sulfur content went up to over 0.1 ppm. As a result, after about 800 hours operation, the sulfur content of desulfurized gas increased to 0.1 ppm. In comparison with Example 1, this result suggests that the desulfurization capacity of the agent decreases with a reduction in zinc concentration.

EXAMPLE 3

In the same desulfurization method as that of Example 1, the town gas was desulfurized using the desulfurization agent prepared in the same manner as that of Example 1 except the atomic ratio of metals was copper:zinc:aluminum=1:12:0.37. The sulfur content of desulfurized gas was measured by the cold trap method of Example 1 until the sulfur content went up to over 0.1 ppm. As a result, after about 250 hours operation, the sulfur content of desulfurized gas increased to 0.1 ppm, and desulfurization capacity severely decreased. In comparison with Example 1, this result suggests that the desulfurization capacity of the agent decreases with an increase in zinc concentration.

EXAMPLE 4

In the same desulfurization method as that of Example 1, the town gas was desulfurized using the desulfurization agent prepared in the same manner as that of Example 1 except the atomic ratio of metals was copper:zinc:aluminum= 1:1.1:3. The sulfur content of desulfurized gas was measured by the cold trap method of Example 1 until the sulfur content went up to over 0.1 ppm. As a result, after about 700 hours operation, the sulfur content of desulfurized gas increased to 0.1 ppm. In comparison with Example 1, this result suggests that the desulfurization capacity of the agent decreases with an increase in aluminum concentration.

EXAMPLE 5

A coke oven gas purified preliminarily by a conventional method was desulfurized by use of the Copper-Zinc-Aluminum desulfurization agent described in Example 6 under conditions substantially identical to the conditions described in Example 6. The obtained desulfurized coke oven gas was introduced into a reforming reactor (ID 160 cm) filled with 3.5 tons of 2% by weight $Ru/Al_2O_3$ catalyst (bulk density 0.8 kg/liter) at a rate of 5000 $Nm^3$/hr and was subjected to reforming at an entrance temperature of 300° C. for 16,000 hours.

The amount of saturation poisoning of the catalyst used was about 0.002 g-S/g-catalyst.

Ruthenium has a very high sulfur adsorptivity and immediately adsorbs sulfur even a slight concentration of sulfur present in the gas phase. The sulfur is considered to be adsorbed by the extreme surface layer (depth to 10 cm from the surface) of the catalyst layer.

Therefore, after the end of the above reaction, the extreme surface layer of the catalyst was analyzed with respect to sulfur by X-ray fluorometry. The result showed that the sulfur content was below the sulfur detection limit of X-ray fluorometry (0.00005 g-S/g-catalyst). Therefore, it was found that the sulfur content in the highly desulfurized raw gas is 0.1 ppb or less calculated according to the following equation:

$$\frac{80 \cdot 80 \cdot 3.14 \cdot 10 \cdot 0.8 \cdot 0.00005/32 \text{ (mol)}}{5000 \cdot 16000/0.0224 \text{ (mol)}} = 0.069 \text{ ppb}$$

EXAMPLE 6

Naphtha having a sulfur content of 100 ppm was first hydrogenated according to the conventional method in the presence of a Ni-Mo hydrodesulfurization catalyst at a temperature of 380° C., pressure of 10 kg/cm$^2$-G, LHSV of 2, and hydrogen/naphtha=0.1 (molar ratio), and was subjected to a primary adsorption desulfurization in contact with a ZnO adsorption desulfurization agent. The sulfur concentration in the naphtha resulting from the primary adsorption desulfurization was about 2 ppm.

On the other hand, to an aqueous solution of copper nitrate, zinc nitrate, and aluminum nitrate was added sodium carbonate as an alkaline substance. The resulting precipitate was, after washing and filtering, molded into tablets of ⅛ inch in height and ⅛ inch in diameter, and the tablets were calcined at about 400° C. Then, 100 cc of the calcined tablets (consisting of 45% copper oxide, 45% zinc oxide, and 10% aluminum oxide) were packed into a desulfurization reactor, through which nitrogen gas containing 2% hydrogen was passed to effect reduction at 200° C. to give a Copper-Zinc-Aluminum desulfurization agent. Through the thus obtained desulfurization agent, the naphtha obtained through the above primary adsorption desulfurization was passed at a temperture of 350° C., pressure of 8 kg/cm$^2$-G, and rate of 400 liter/hours to effect higher order desulfurization. The sulfur concentration in the higher desulfurized naphtha was 0.1 ppb or less throughout 7000 hours of operation calculated as described above in Example 5.

Then, using the naphtha obtained by the above high-grade desulfurization as the raw material, low-temperature steam reforming was conducted through a reactor (ID 20 mm) of flowing quasi-adiabatic type, in the presence of ruthenium catalyst (with 2 wt. % ruthenium carried by gamma-alumina carrier) in the conditions shown in Table 2 to produce methane.

TABLE 2

| Reaction temperature (inlet) | 490° C. (adiabatic) |
|---|---|
| Reaction pressure | 8 kg/cm$^2$-G |
| Naphtha flow rate | 160 cc/hr |
| Amount of catalyst | 100 cc |
| S/C | 1.7 |
| H$_2$/naphtha | 0.1 (molar ratio) |

Figure 4:
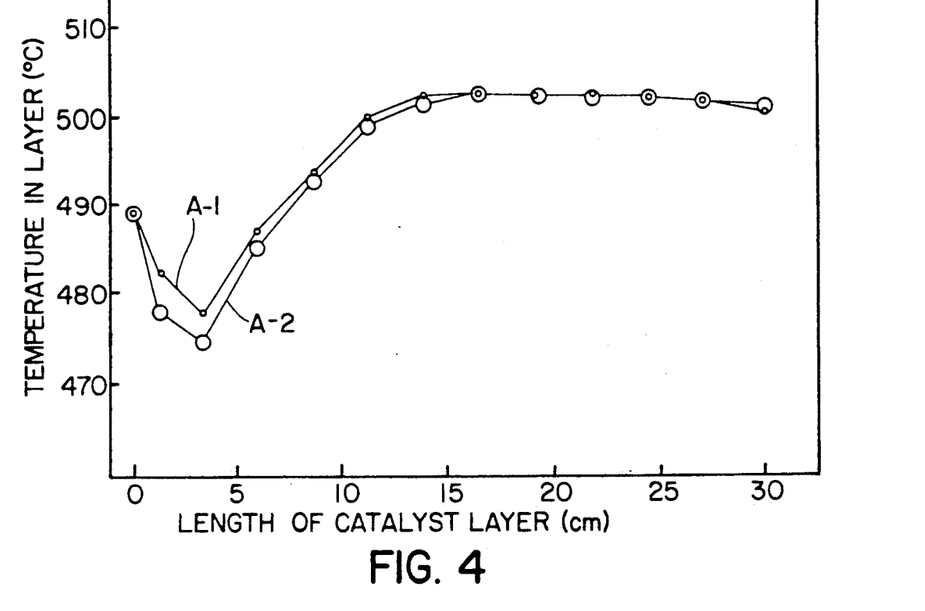
FIGS. 4, 5, 6, and 7 are graphs showing the effect of the purification degree of hydrocarbon on the steam reforming.

The results are shown in FIG. 4. In Fig. 4, curve A-1 represents a temperature profile in the catalyst layer in the reactor just after the start of the reaction, and curve A-2 represents a temperature profile in the catalyst layer in the reactor 400 hours after the start of the reaction.

According to the invention, the reforming catalyst keeps an enough activity even after the lapse of 400 hours, and therefore, in the same manner as just after the start of the reaction, the temperature is dropped due to the endothermic reaction of decomposition of the naphtha at the inlet of the catalyst layer. Then, the temperature is again raised due to the subsequent exothermic reaction such as methanation and CO conversion.

Such a high activity state of the reforming catalyst is also supported by a trace amount of carbon deposition (0.4 wt % or less only at the inlet of the reactor) and no sulfur deposition (less than the detection limit of the X-ray fluorometry even at the inlet of the reactor) in each position on the catalyst after the lapse of 400 hours. Therefore, according to the invention, a great amount of hydrogen or steam is not required to prevent carbon deposition, the required amount of the reforming catalyst are largely reduced, thus permitting the reactor made smaller in size.

COMPARISON EXAMPLE D

According to a conventional method, naphtha containing 100 ppm of sulfur was first hydrogenated in the presence of a Ni-Mo hydrodesulfurization catalyst at a temperature of 380° C., pressure of 10 kg/cm$^2$-G, LHSV of 2, and hydrogen/naphtha=0.1 (molar ratio). Then, the product was subjected to a primary adsorption desulfurization in contact with a ZnO adsorption desulfurization agent. The sulfur concentration in the naphtha obtained through the primary desulfurization was about 2 ppm.

The thus obtained primarily desulfurized naphtha was subjected to steam reforming in the same manner as in Example 6.

Figure 5:
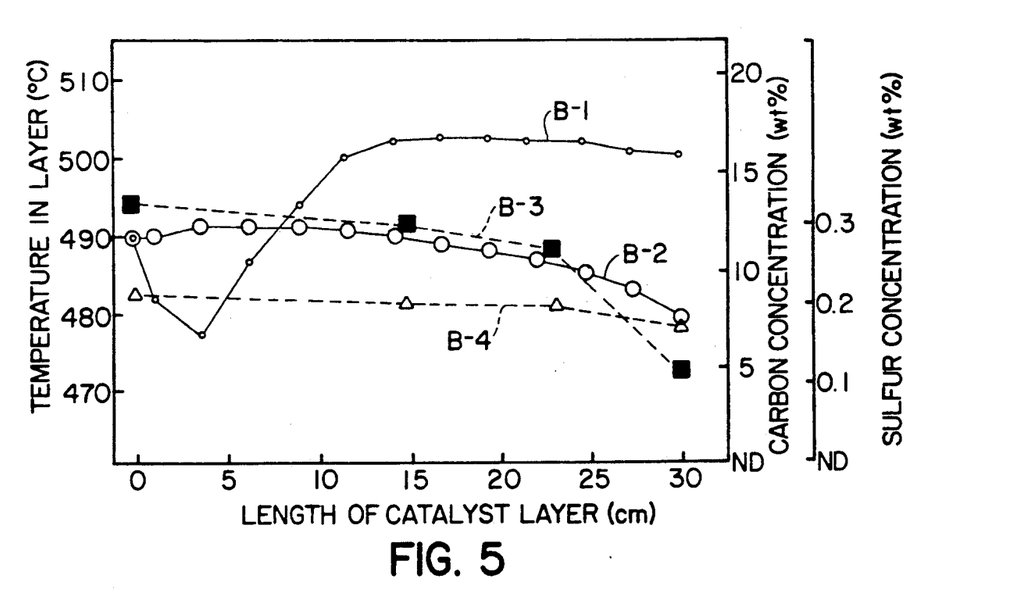

The results are shown in FIG. 5. In FIG. 5, curve B-1 represents a temperature profile in the catalyst layer in the reactor immediately after the start of the reaction and curve B-2 represents a temperature profile in the catalyst layer in the reactor 200 hours after the start of the reaction.

As apparent from curve B-1, immediately after the start of reaction, the reforming catalyst has an enough activity, and therefore, the temperature is dropped at the inlet where decomposition of naphtha, which is an endothermic reaction, take place. Then, the temperature is raised due to the subsequent exothermic reactions such as methanation and CO conversion.

In contrast, as obvious from curve B-2, after the lapse of 200 hours, the reforming catalyst is almost completely deactivated and therefore the change of temperature due to the endothermic and exothermic reactions is not observed in the catalyst layer, and the primarily desulfurized naphtha is discharged from the reforming reactor as unreacted.

Such deactivated state of the reforming catalyst is supported by curve B-3 showing the quantity of carbon deposition (% based on the weight of the catalyst) in each position on the catalyst after 200 hours and curve B-4 showing the quantity of sulfur deposition (% based on the weight of the catalyst).

Such a large amount of carbon deposition causes clogging of pores in the catalyst to reduce activity thereof and further causes pulverization of the catalyst to accompany clogging of the reactor and increase of differential pressure. Therefore, there are to be prevented as far as possible for long period operation. They are generally prevented by use of a large quantity of steam or hydrogen.

EXAMPLE 7

Using each of the naphtha purified by the high-grade desulfurization and obtained in the same manner as in Example 6, and the naphtha purified by primary desulfurization and obtained in the same manner as in Comparison Example D as raw materials, steam reforming was conducted using a reactor of flowing quasi-adiabatic type (ID 20 mm) in the presence of nickel catalyst (prepared by co-precipitation, NiO concentration 50 wt. %), which is most popular as a steam reforming catalyst, in the conditions shown in Table 3.

TABLE 3

| Reaction temperature (Inlet) | 490° C. (adiabatic) |
|---|---|
| Reaction pressure | 8 kg/cm$^2$-G |
| Flow rate of naphtha | 160 cc/hr |
| Quantity of catalyst | 100 cc |
| S/C | 2.5 |
| H$_2$/naphtha | 0.1 (molar ratio) |

Figure 6:
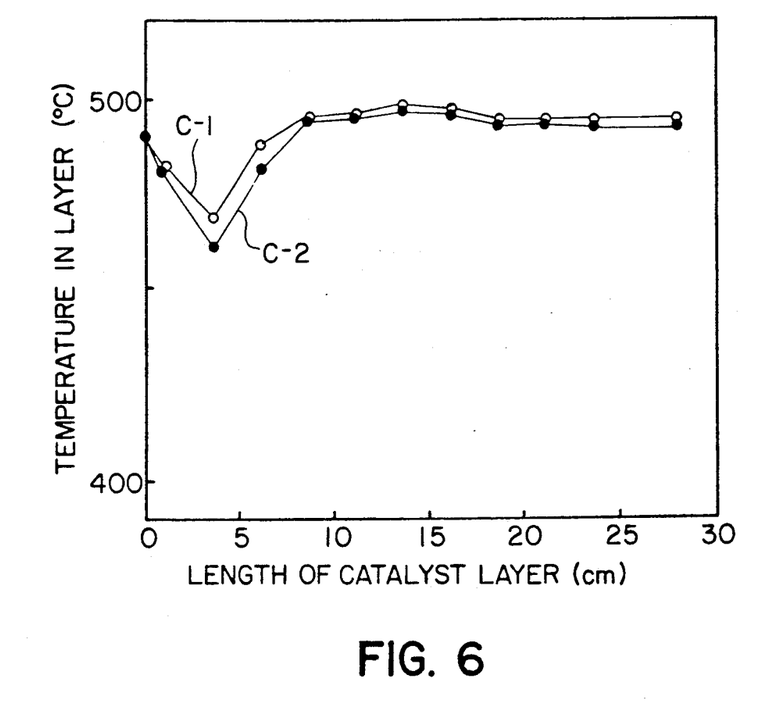
Figure 7:
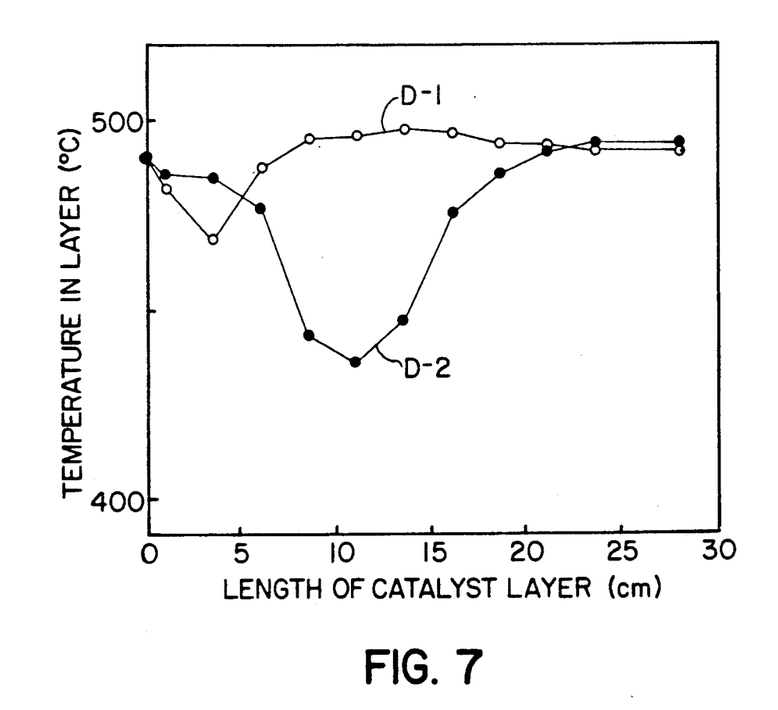

The results are shown in FIGS. 6 and 7. In FIG. 6, curve C-1 and curve C-2 show the temperature profiles in the catalyst layer in the reactor immediately after and 400 hours after, respectively, the start of the reaction. When the naphtha purified by the high-grade desulfurization was used, the temperature profile is not changed even after the lapse of 400 hours like in Example 6, showing that the reforming catalyst is keeping satisfactorily high activity. Therefore, according to the present invention, even a Ni catalyst does not require such a large quantity of hydrogen or steam as used so far for preventing carbon deposition, leading to largely decreased consumption of the reforming catalyst and miniaturized reactor owing to the decreased requirement of the catalyst.

FIG. 7 shows the case the primarily desulfurized naphtha was used. In FIG. 7, curve D-1 and curve D-2 shows the temperature profile in the catalyst layer in the reactor immediately after and 400 hours after, respectively, the start of the reaction.

As obvious from the comparison of curve D-1 and D-2, after 400 hours the reforming catalyst near the reactor inlet has been deactivated, accordingly the region of temperature change due to endothermic and exothermic reactions has been moved in the direction to the outlet of the catalyst layer. As this time, as much as 10% by weight or more carbon has been deposited, and increased differential pressure inhibited further operation.

EXAMPLE 8

Using as the raw material the naphtha purified by the high-grade desulfurization and obtained in the same manner as in Example 6, low-temperature steam reforming was conducted by use of an adiabatic type reactor (ID 20 mm) in the presence of the same Ru catalyst as in Example 6 in the conditions shown in Table 4, and subsequently the reformed gas was subjected to high-temperature steam reforming using an external-heating reactor (ID 20 mm) in the presence of the same Ru catalyst in the conditions shown in Table 5.

TABLE 4

| Reaction temperature (Inlet) | 490° C. (adiabatic) |
|---|---|
| Reaction pressure | 8 kg/cm$^2$-G |
| Flow rate of naphtha | 160 cc/hr |
| Quantity of catalyst | 40 cc |
| S/C | 1.7 |
| H$_2$/naphtha | 0.1 (molar ratio) |

TABLE 5

| Reaction temperature | Inlet: 500° C. |
|---|---|
|  | Outlet: 750° C. |
| Reaction pressure | 8 kg/cm$^2$-G |
| Quantity of catalyst | 60 cc |

As a result, no deactivation phenomenon of the catalyst such as slipping of naphtha appeared and no carbon deposition on the catalyst was observed even after a lapse of 2000 hours.

COMPARISON EXAMPLE E

Using as the raw material the naphtha purified by primary desulfurization and obtained in the same manner as in Comparison Example D, steam reforming was conducted in the same manner as in Example 8.

As a result, differential pressure increased in the high-temperature steam reforming reactor after 200 hours operation and further operation was inhibited. At this time, not only almost all amount of naphtha was unreacted and slipped out of the reactor, but also as much as 20 wt. % of carbon has been deposited on the catalyst of the inlet part of the reactor in which differential pressure increased.

EXAMPLE 9

Using as the raw material the naphtha purified by the high-grade desulfurization and obtained in the same manner as in Example 6, low-temperature steam reforming was conducted by use of an adiabatic type reactor (ID 20 mm) in the presence of the same Ni catalyst as in Example 7 in the conditions shown in Table 6, and subsequently the reformed gas was subjected to high-temperature steam reforming using an external-heating reactor (ID 20 mm) in the presence of a Ni catalyst on the market (Ni concentration 14 wt. %, steam reforming catalyst for natural gas) in the conditions shown in Table 7.

TABLE 6

| Reaction temperature (Inlet) | 490° C. (adiabatic) |
|---|---|
| Reaction pressure | 8 kg/cm$^2$-G |
| Flow rate of naphtha | 160 cc/hr |
| Quantity of catalyst | 40 cc |
| S/C | 2.5 |
| H$_2$/naphtha | 0.1 (molar ratio) |

TABLE 7

| Reaction temperature | Inlet: 500° C. |
|---|---|
|  | Outlet: 750° C. |
| Reaction pressure | 8 kg/cm$^2$-G |
| Quantity of catalyst | 60 cc |

As a result, no deactivation phenomenon of the catalyst such as slipping of naphtha appeared and no carbon deposition on the catalyst was observed even after a lapse of 800 hours.

COMPARISON EXAMPLE F

Using as the raw material the naphtha purified by primary desulfurization and obtained in the same manner as in Comparison Example D, steam reforming was conducted in the same manner as in Example 9.

As a result, differential pressure increased in the high-temperature steam reforming reactor after 400 hours operation and further operation was inhibited. At this time, not only almost all amount of naphtha was unreacted and slipped out of the reactor, but also more than 10 wt. % of carbon has been deposited on the catalyst of the inlet part of the reactor in which differential pressure increased.

What is claimed is:

1. A process for desulfurizing and steam reforming sulfur-containing hydrocarbons comprising the steps of:
   (a) desulfurizing the sulfur-containing hydrocarbon to a sulfur content of 5 ppb or less by use of a desulfurization agent;
   (b) reforming the desulfurized hydrocarbon in an adiabatic reactor by use of steam, and
   (c) reforming the resultant gas reformed in the course of step (b) in an external-heating reformer furnace.

2. A process for desulfurizing and steam reforming sulfur-containing hydrocarbons as claimed in claim 1, wherein the hydrocarbon is desulfurized to a sulfur content of 1 ppb or less.

3. A process for desulfurizing and steam reforming sulfur-containing hydrocarbons as claimed in claim 2, wherein the hydrocarbon is desulfurized to a sulfur content of 0.1 ppb or less.

4. A process for desulfurizing and steam reforming sulfur-containing hydrocarbons as claimed in claim 3, wherein the desulfurization agent is a Copper-Zinc desulfurization agent obtained by hydrogen reduction of a copper oxide-zinc oxide mixture prepared by a co-precipitation process using a copper compound and a zinc compound.

5. A process for desulfurizing and steam reforming sulfur-containing hydrocarbons as claimed in claim 3, wherein the desulfurization agent is a Copper-Zinc-Aluminum desulfurization agent obtained by hydrogen reduction of a copper oxide-zinc oxide-aluminum oxide mixture prepared by a co-precipitation process using a copper compound, a zinc compound and an aluminum compound.

6. A process for desulfurizing and steam reforming sulfur-containing hydrocarbons as claimed in claim 4, wherein the Copper-Zinc desulfurization agent is obtained by hydrogen reduction of a copper oxide-zinc oxide mixture having a copper-zinc ratio of 1: about 0.3-10 (atomic ratio), at about 150°-300° C. using an inert gas containing hydrogen in a concentration of 6 vol. % or less.

7. A process for desulfurizing and steam reforming sulfur-containing hydrocarbons as claimed in claim 6, wherein the copper oxide and zinc oxide are used in a copper-zinc ratio of 1: about 0.5-3 (atomic ratio).

8. A process for desulfurizing and steam reforming sulfur-containing hydrocarbons as claimed in claim 7, wherein the copper oxide and zinc oxide are used in a copper-zinc ratio of 1: about 1-2.3 (atomic ratio).

9. A process for desulfurizing and steam reforming sulfur-containing hydrocarbons as claimed in claim 8, wherein the hydrogen concentration in the hydrogen-containing inert gas is 0.5-4 vol. %.

10. A process for desulfurizing and steam reforming sulfur-containing hydrocarbons as claimed in claim 5, wherein the Copper-Zinc-Aluminum desulfurization agent is obtained by hydrogen reduction of a copper oxide-zinc oxide-aluminum oxide mixture having a copper-zinc-aluminum ratio of 1: about 0.3-10: about 0.05-2 (atomic ratio), at about 150°-300° C. using an inert gas containing hydrogen in a concentration of 6 vol. % or less.

11. A process for desulfurizing and steam reforming sulfur-containing hydrocarbons as claimed in claim 10, wherein the copper oxide, zinc oxide and aluminum oxide are used in a copper-zinc-aluminum ratio of 1: about 0.6-3: about 0.3-1 (atomic ratio).

12. A process for desulfurizing and steam reforming sulfur-containing hydrocarbons as claimed in claim 11, wherein the hydrogen concentration in the hydrogen-containing inert gas is 0.5-4 vol. %.

13. A process for desulfurizing and steam reforming sulfur-containing hydrocarbons as claimed in claim 3, 9 or 12, wherein an S/C value is in a range of 0.7-3.5.

14. A process for desulfurizing and steam reforming sulfur-containing hydrocarbons as claimed in claim 13, wherein a hydrocarbon purified by a primary desulfurization using a ZnO desulfurization agent is used as a raw material.

15. A process for desulfurizing and steam reforming sulfur-containing hydrocarbons as claimed in claim 14, wherein the raw hydrocarbon is a hydrodesulfurized hydrocarbon.

16. A process for desulfurizing and steam reforming sulfur-containing hydrocarbons as claimed in claim 13, wherein a nickel catalyst is used as a steam reforming catalyst and the S/C value is in a range of 2.0-3.0.

17. A process for desulfurizing and steam reforming sulfur-containing hydrocarbons as claimed in claim 4, wherein the Copper-Zinc desulfurization agent is obtained by hydrogen reduction of a copper oxide-zinc oxide mixture having a copper-zinc atomic ratio of 1: about 0.3-10.0.

18. A process for desulfurizing and steam reforming sulfur-containing hydrocarbons as claimed in claim 5, wherein the Copper-Zinc-Aluminum desulfurization agent is obtained by hydrogen reduction of a copper oxide-zinc oxide-aluminum oxide mixture having a copper-zinc-aluminum atomic ratio of 1: about 0.3-10: about 0.05-2.

19. A process for desulfurizing and steam reforming sulfur-containing hydrocarbons as claimed in claim 14, wherein a nickel catalyst is used as a steam reforming catalyst and the S/C value is in a range of 2.0-3.0.

20. A process for desulfurizing and steam reforming sulfur-containing hydrocarbons as claimed in claim 15, wherein a nickel catalyst is used as a steam reforming catalyst and the S/C value is in a range of 2.0-3.0.

* * * * *